United States Patent [19]

Platonov et al.

[11] 4,106,321

[45] Aug. 15, 1978

[54] METHOD OF PRODUCING MOULDED PARTS

[76] Inventors: Mikhail Alexandrovich Platonov, Profsojuznaya ulitsa, 96, kv. 100; Grigory Vasilievich Pokrovsky, 9 ulitsa Sokolinoi gory 1, kv. 15, both of Moscow, U.S.S.R.

[21] Appl. No.: 682,104

[22] Filed: Apr. 30, 1976

Related U.S. Application Data

[63] Continuation of Ser. No. 584,170, Jun. 5, 1975, abandoned, which is a continuation of Ser. No. 497,735, Aug. 15, 1974, abandoned, which is a continuation of Ser. No. 396,221, Sep. 11, 1973, abandoned.

[51] Int. Cl.² ............................................. B21D 22/00
[52] U.S. Cl. ......................................... 72/348; 72/358
[58] Field of Search ............... 72/343, 347, 348, 358; 29/148.4 B, 463, 464

[56] References Cited

U.S. PATENT DOCUMENTS

| | | | |
|---|---|---|---|
| 808,177 | 12/1905 | Thiem | 72/343 |
| 1,054,669 | 3/1913 | Bowen | 72/349 X |
| 2,159,901 | 5/1939 | LeJune | 72/345 |
| 3,651,559 | 3/1972 | Lawlor | 29/422 |
| 3,660,880 | 5/1972 | Glenn | 29/148.4 B |

*Primary Examiner*—Leon Gilden
*Attorney, Agent, or Firm*—Holman & Stern

[57] ABSTRACT

Moulded parts are produced by preliminarily making a bend in the moulding zone of a part blank, whose radius is less than a given radius of a part to be produced. The prepared blank is placed in a die and pressure is exerted only on the end edges of the blank along the generant of the bending section. With this method parts can be produced whose walls are as thick as the material of the original blank and this improves the reliability and strength of parts produced with a resultant reduction in the overall weight of these parts. In addition, complex overall shapes of parts without distortion can be produced by applying the above method.

1 Claim, 3 Drawing Figures

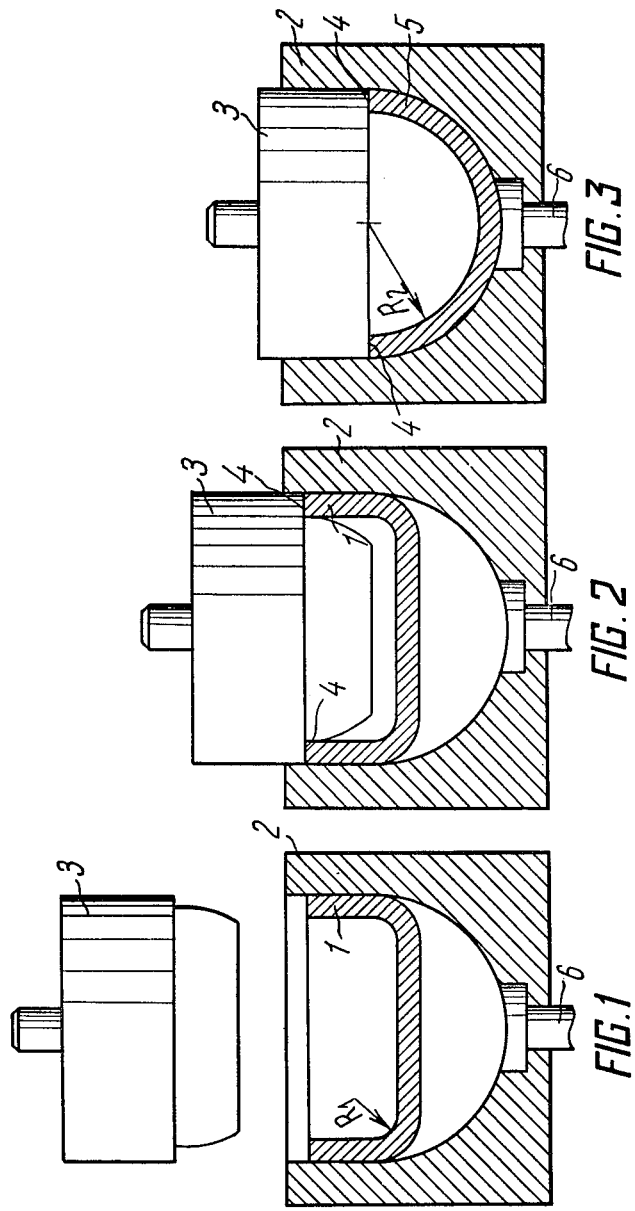

METHOD OF PRODUCING MOULDED PARTS

This is a continuation of application Ser. No. 584,170 filed June 5, 1975 which in turn is a Continuation of Ser. No. 497,735 of 8/15/74, which in turn is a Continuation of Ser. No. 396,221 of 9/11/73, all of which are now abandoned.

BACKGROUND OF THE INVENTION

The present invention relates generally to metal shaping methods and more particularly to methods of producing moulded parts.

The invention may find application in the automobile, aviation and gas-chemical industries.

The method according to the present invention is suitable for producing parts both from metals and other materials such as plastics.

It is known that parts moulding methods are used most frequently when it is necessary to produce vessels capable of withstanding internal pressures of 10 to 500 and more atmospheres.

These vessels should meet special requirements with respect to their strength and operational reliability. Such vessels employed in the aviation industry should meet additional requirements, i.e. they should be of a minimum weight.

Blanks for the above vessels are usually produced by sheet metal stamping. The known method of producing moulded parts consists in that a flat sheet blank is moulded by 1-2-3 passes by means of a die and a punch having a shape similar to that of the part being stamped (spherical, tapered, flat-end).

In the conventional method of producing moulded parts a flat blank is placed on the die ring of a size of a part to be produced, then by means of the punch the blank is exposed to the action of pressure until a bend of a required radius is obtained in the moulding zone of the blank to give the latter the shape required.

Hard-to-deform materials such as titanium alloys are moulded at increased temperature of both the equipment and blank.

The principal disadvantage of the above method of producing moulded parts is that the walls of a part are thinned at the cupola portion of the part.

The degree of thinning reaches a value equal to 20-30% of the original thickness of the blank being moulded whereas during moulding of parts at increased temperature the degree of thinning of the walls of the part amounts to 50% of the original thickness of the material of the blank being moulded.

The thinning takes place due to the fact that at the commencement of the moulding process the punch exerts its pressure only on a small area of the blank and the maximum force should be applied to this area to start deformation of the entire blank.

The thickness of the blank at the point where the punch initially contacts the blank varies only slightly because of the force of friction between the surfaces of the elements mentioned, though the considerable thinning takes place in all nearby sections.

Due to this thinning of moulded parts, blanks are used of considerably larger thickness to give strength to vessels produced thereafter, which adds weight to the parts produced and causes excess consumption of materials.

In order to produce a moulded part of strictly limited weight, the part made from a blank of increased thickness undergoes machining, for example turning of external and internal surfaces of the product made. This machining is labor-consuming one and requires complex equipment. Moreover, machined parts are less durable and reliable than those made of sheet material. This is because of the disturbed structure of material as is the case with machining.

In addition, the known method of producing moulded parts is devoid of the ability to produce parts with an exactly given contour. Thus, round parts become elliptical both at edges and in cross sections. In order to correct the distorted shape, labor-consuming and expensive operations are used which in many cases do not provide the required accuracy are contour and therefore parts are stress-assembled (stress-welding of hemispheres) which impairs the reliability of joints.

SUMMARY OF THE INVENTION

The object of the present invention is to obviate the above disadvantages.

Another object of the present invention is to provide a method of producing moulded parts whose walls are as thick as the material of the original blank.

Still another object of the present invention is to provide a method of producing moulded parts which is capable of obtaining complex overall shapes of parts with no distortion.

These and other objects are achieved by a method of producing moulded parts, wherein pressure is exerted on a blank placed in a die until a given bending radius is obtained in the moulding zone of the blank whereas according to the invention a bend is preliminarily made in the moulding zone of the blank whose curvatures radius is less than the given radius of the part being produced and thereafter pressure is exerted only on the end edges of the blank along the generant of the bending section with a resultant gradual increase of the bending radius to the required value.

The new method produces parts whose walls are as thick as the material of the original blank with a resultant 20-30% weight reduction of parts produced as compared with prior-art produced ones at the same minimum thickness of walls, and a consequent 30-50% savings of material needed. The method disclosed makes it possible to obtain complex overall shapes of parts without distortion, thus doing away with the necessity of final sizing and calibrating the shape of parts.

BRIEF DESCRIPTION OF THE DRAWINGS

In order to make the present invention more readily understood the method will now be described in detail with reference to the accompanying drawings, in which:

FIG. 1 shows the die with a blank placed in it and the punch in its initial position;

FIG. 2 is a view similar to FIG. 1 at the beginning of the moulding process; and FIG. 3 is a view similar to FIG. 1 at the end finishing of the moulding process.

DETAILED DESCRIPTION OF THE PREFERRED EMBODIMENT

The method of producing moulded parts pursuant to the invention consists in that prior to before moulding a part of a needed profile, the blank is prepared in such a way that its bending radius in the moulding zone, i.e. the radius of conjugation of the blank wall and bottom or that of the blank flanges is less than the required bending radius in the moulded zone of the ready part.

The blank may be preliminarily prepared to further moulding by way of, for instance, sheet stamping.

The blank which has been thus prepared is placed in the die and pressure is thereafter exerted on the blank by means of the punch. According to the present invention, pressure is exerted only on the end edges of the blank along the generant of the bending section the required part being moulded and, in addition, a certain increase in the thickness of the parts walls takes place due to the strictly directional compression of the blank material.

Also, the compressive force directed strictly along the generant of the bending section fixes the part's shape because the spring action after relieving the pressure is effected along the generant of the bending section but not along the normal to this generant as is the case in the known method of producing moulded parts.

Thus, due to the revealed expediency of the pressure action, in the course of part moulding, strictly along the generant of the bending section, parts can be produced whose walls are as thick as the material of the original blank to allow a weight of parts to be reduced because of a possibility to use blanks with the minimum wall thickness permissible for the ready part. This reduces the amount of material needed.

Since the spring action after relieving the pressure is effected along the generant of the bending section, it becomes possible to obtain complex shapes of parts without distortion, thus doing away with the necessity of finishing and calibrating the shapes of parts.

An example of producing a hemisphere.

A blank 1 preliminarily made by way of sheet-stamping, of a bending radius $R_1$ in its moulding zone being less than a bending radius $R_2$ of a hemisphere to be produced, is placed in a die 2 (FIG. 1). The die 2 is of a shape and size of a part to be produced, namely a hemisphere. A punch 3 is lowered onto the blank 1 until its moulding surface comes into contact with the end edges of the blank 1 (FIG. 2). The moulding surface of the punch 3 has a protrusion whereas the difference between the external diameter of the punch 3 and the diameter of the protrusion is equal to the thickness of the blank 1. Application of the above-shaped punch prevents loss of stability of the walls of a part to be produced, in the course of moulding.

Then pressure shaping is started. Due to the fact that the punch 3 contacts only end edges 4 of the blank 1, the moulding pressure of the punch 3 is directed along the generant of the bending section of the blank 1.

As can be seen from FIG. 3, the blank 1 due to the effects of pressure of the punch 3 acquires the shape of the die 2, i.e. the blank moulding zone has the bending radius $R_2$ equal to the radius of the hemisphere being produced.

Upon finishing the moulding process the punch 3 is removed from the die 2, while a moulded hemisphere 5 is taken out of the die 2 by means of an ejector 6.

The produced hemisphere 5 at all points on its surface is as thick as the material of the original blank and its overall shape is of high accuracy.

It will be understood that various changes may be made in the method by those skilled in the art without departing from the spirit of the invention.

We claim:

1. A method of producing a moulded part comprising the steps of: bending a blank to form bending sections having open upper end edges and a radius less than a given bending radius of a part to be produced; placing the bent blank completely in a die; and exerting pressure only on the open upper end edges of the blank along the generant of the bending sections with a resultant gradual increase of the bending radius to the given bending radius.

* * * * *